US010218196B1

(12) United States Patent
Jones et al.

(10) Patent No.: US 10,218,196 B1
(45) Date of Patent: Feb. 26, 2019

(54) SELECTION OF CHARGING MODES FOR AUTONOMOUS DEVICE

(71) Applicant: GM GLOBAL TECHNOLOGY OPERATIONS LLC, Detroit, MI (US)

(72) Inventors: Brandon R. Jones, White Lake, MI (US); Ryan Ashby, Novi, MI (US); Tony Wingett, Ortonville, MI (US); Margaret C. Richards, Troy, MI (US); Matthew S. Stout, Hartland, MI (US); Cody D. Berman, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 32 days.

(21) Appl. No.: 15/677,631

(22) Filed: Aug. 15, 2017

(51) Int. Cl.
*H02J 7/00* (2006.01)
*B60L 11/18* (2006.01)

(52) U.S. Cl.
CPC .......... *H02J 7/0052* (2013.01); *B60L 11/184* (2013.01); *B60L 11/1861* (2013.01); *H02J 7/0047* (2013.01)

(58) Field of Classification Search
None
See application file for complete search history.

(56) References Cited

U.S. PATENT DOCUMENTS

| | | | | |
|---|---|---|---|---|
| 2008/0039979 | A1* | 2/2008 | Bridges | B60L 11/1816 700/292 |
| 2010/0017249 | A1* | 1/2010 | Fincham | B60L 3/12 705/412 |
| 2012/0112697 | A1* | 5/2012 | Heuer | B60L 11/1818 320/109 |
| 2013/0282472 | A1* | 10/2013 | Penilla | B60S 5/06 705/14.35 |
| 2013/0346308 | A1* | 12/2013 | Naito | H01M 10/44 705/41 |
| 2016/0375783 | A1* | 12/2016 | Uyeki | B60L 11/1846 320/137 |

\* cited by examiner

*Primary Examiner* — Arun C Williams
(74) *Attorney, Agent, or Firm* — Quinn IP Law

(57) ABSTRACT

A system of selecting charging modes for a rechargeable energy storage unit in an autonomous device includes a controller having a processor and tangible, non-transitory memory on which is recorded instructions. The controller is configured to determine availability of at least one charging station and at least one parking lot through a survey of local charging infrastructure and local parking infrastructure, respectively, within a predefined radius of the autonomous device. The controller is configured to determine if it is cost-effective during an excursion to incur a charging fee at the charging station or incur a parking fee at the parking lot. If it is cost-effective to incur the charging fee, then the controller is configured to selectively employ at least one of a plurality of charging modes, including an open-ended charging mode and a defined departure charging mode.

20 Claims, 2 Drawing Sheets

SELECTION OF CHARGING MODES FOR AUTONOMOUS DEVICE

INTRODUCTION

The present disclosure relates to a selection of charging modes for a rechargeable energy storage unit in an autonomous device. The use of purely electric vehicles and hybrid vehicles, such as battery electric vehicles, window extended electric vehicles, hybrid electric vehicles, plug-in hybrid electric vehicles and fuel cell hybrid electric vehicles, has increased over the last few years. Hybrid electric vehicles and purely electric vehicles generally include a rechargeable energy storage unit, such as a high voltage battery having a number of battery cells, which requires periodic recharging.

SUMMARY

Disclosed herein are a system and method of selecting charging modes for a rechargeable energy storage unit in an autonomous device. The system includes a controller having a processor and tangible, non-transitory memory on which is recorded instructions. Execution of the instructions by the processor causes the controller to determine availability of at least one charging station and at least one parking lot through a survey of local charging infrastructure and local parking infrastructure within a predefined radius of the autonomous device. The controller is configured to determine if it is cost-effective during an excursion to incur a charging fee at the charging station or incur a parking fee at the parking lot. If it is cost-effective to incur the charging fee, then the controller is configured to selectively employ at least one of a plurality of charging modes, including an open-ended charging mode and a defined departure charging mode.

The defined departure charging mode is employed where a predefined departure time is selected by a user of the autonomous device. The defined departure charging mode includes derating a charging current applied to the rechargeable energy storage unit such that charging is completed at the predefined departure time.

A state of charge (SOC) indicator is configured to indicate a state of charge of the rechargeable energy storage unit. The state of charge reading includes a predefined first window, a predefined second window and a predefined third window each having a respective maximum and a respective minimum. The respective minimum of the third window ($W_3$) is greater than the respective maximum of the second window ($W_2$), while the respective minimum of the second window ($W_2$) is greater than the respective maximum of the first window ($W_1$).

The controller is configured to employ the open-ended charging mode where no predefined departure time is selected. The open-ended charging mode may include employing a predetermined relatively high charging current when the state of charge reading is in the predefined first window and employing a predetermined relatively low charging current when the state of charge reading is in the predefined second window. The open-ended charging mode may include employing zero current when the state of charge reading is in the predefined third window. In one embodiment, the predetermined relatively high charging current is the maximum current supported by the charging station and the predetermined relatively low charging current is the minimum current supported by the charging station.

A mobile application is configured to be accessible by a user of the autonomous device. The controller is configured to send a notification to the user, via the mobile application, regarding an estimated completion time for the energy storage device to reach a predefined threshold charge level. The mobile application may be configured to allow the user to summon the autonomous device remotely. The mobile application may be configured to allow the user to terminate a charging session and summon the autonomous device prior to an end of the excursion.

The autonomous device may be configured to remain at the charging station until the mobile application commands it to leave. The plurality of charging modes includes an idle charging mode configured such that a charging current applied to the rechargeable energy storage unit is about zero. The controller may be configured to continuously monitor the local charging infrastructure to locate available charging stations within the predefined radius that allow the idle charging mode.

The above features and advantages and other features and advantages of the present disclosure are readily apparent from the following detailed description of the best modes for carrying out the disclosure when taken in connection with the accompanying drawings.

DETAILED DESCRIPTION

Figure 1:
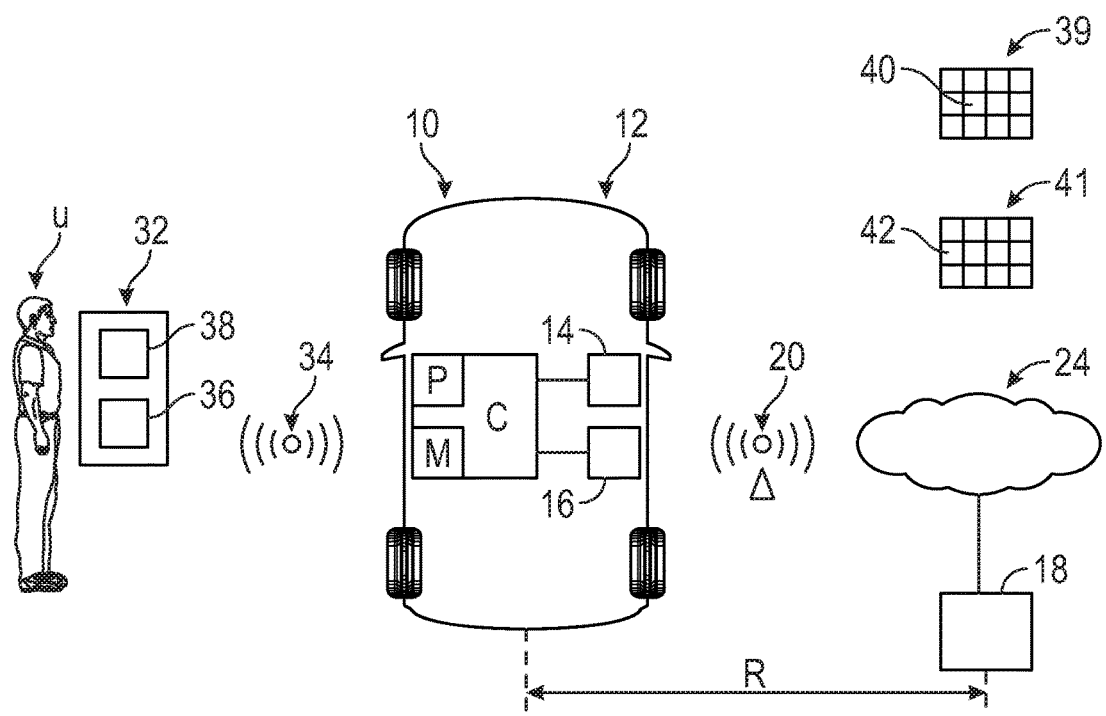
FIG. 1 is a schematic diagram of a system of selecting charging modes for a rechargeable energy storage unit in an autonomous device, the device having a controller.

Referring to the drawings, wherein like reference numbers refer to like components, FIG. 1 schematically illustrates an autonomous device 10 that is capable of autonomously executing control functions without direct operator commands. The autonomous device 10, hereinafter referred to as "device 10," may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other transportation device. The device 10 may take many different forms and include multiple and/or alternate components and facilities.

Referring to FIG. 1, the device 10 includes a rechargeable energy storage unit 14, such as a high voltage battery having a number of battery cells. Described below is a system 12 of selecting charging modes for the rechargeable energy storage unit 14 during an excursion or trip. The rechargeable energy storage unit 14 may include battery cells of different chemistries, including not limited to, lithium-ion, lithium-iron, nickel metal hydride and lead acid batteries. The device 10 may include an additional power source 16, such as but not limited to, an internal combustible engine or a fuel cell.

Referring to FIG. 1, the device 10 includes a controller C in communication with the rechargeable energy storage unit 14. The controller C includes at least one processor P and at least one memory M (or non-transitory, tangible computer readable storage medium) on which are recorded instructions for executing a method 100, described below with reference to FIG. 3. The memory M can store controller-executable instruction sets, and the processor P can execute the controller-executable instruction sets stored in the memory M.

Referring to FIG. 1, the controller C is configured to communicate with a fleet management unit 18. In one embodiment, the controller C may communicate with the fleet management unit 18 via an access point 20 and a wireless network 24. The access point 20 is employed to broadcast a wireless signal that various devices can detect and "tune" into. The wireless network 24 may be a Wireless Local Area Network (LAN) which links multiple devices using a wireless distribution method. The wireless network 24 may be a Wireless Metropolitan Area Networks (MAN) which connects several wireless LANs. The wireless network 24 may be a Wireless Wide Area Network (WAN) which covers large areas such as neighboring towns and cities.

Referring to FIG. 1, the user U may employ a cellular wireless device 32 (such as a smart phone) configured to communicate with the controller C via a wireless connection 34. The cellular wireless device 32 may have Bluetooth™ connectivity and the wireless connection 34 may be a Bluetooth™ connection. Bluetooth™ is defined as being a short-window radio technology (or wireless technology) aimed at simplifying communications among Internet devices and between devices and the Internet. Bluetooth™ is an open wireless technology standard for transmitting fixed and mobile electronic device data over short distances and creates personal networks operating within the 2.4 GHz band. It is to be understood that other types of connection may be employed. The fleet management unit 18, cellular wireless device 32, mobile application 36 ("apps") may employ circuitry and components that are available to those skilled in the art.

Referring to FIG. 1, the cellular wireless device 32 may be configured to run a mobile application 36. In areas of limited parking or expensive parking rates, the system 12 presents the user U with the option of sending the device 10 out to a charging station 40 or to a parking lot 42. The controller C may be configured to send a notification to the user U, via the mobile application 36, regarding an estimated completion time for the rechargeable energy storage device 14 to reach a predefined threshold charge level. The mobile application 36 may be configured to allow the user U to summon the device 10 remotely. The mobile application 36 may be configured to allow the user U to terminate a charging session and summon the device 10 prior to an end of the excursion.

Referring to FIG. 1, the cellular wireless device 32 may be equipped with a network adapter 38 configured to connect with the access point 20 and the wireless network 24. The network adapter 38 interfaces with the wireless network 24 and may be built on a printed circuit board with jumpers. The network adapter 38 may connect with the wireless network 24 through a built-in or externally connected antenna and may support LAN protocols such as TCP/IP. The user U of the autonomous device 10 may include but is not limited to: a passenger of the device 10, an owner of the device 10, as well as a company that operates a fleet of devices 10. For example, the device 10 may be owned and operated by a ridesharing company and the user U may be an employee of the company.

Figure 2:
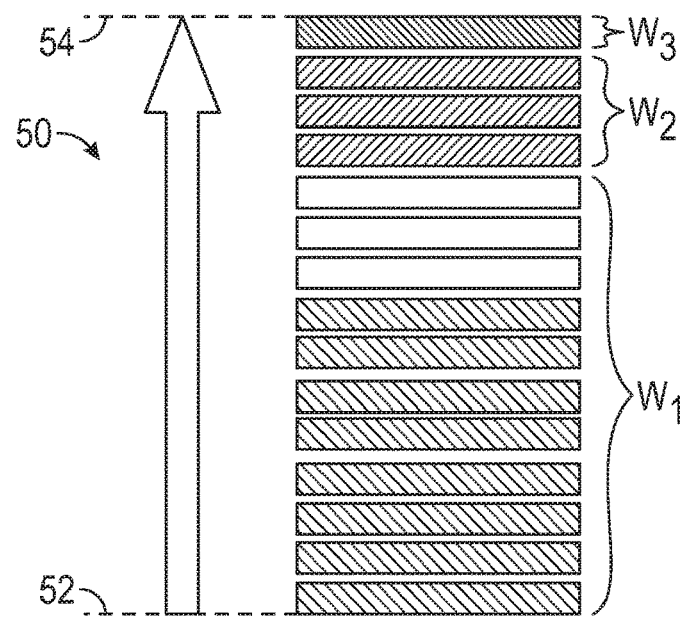
FIG. 2 is a schematic diagram of a state of charge indicator for the device of FIG. 1.

FIG. 2 schematically illustrates a state of charge indicator or meter 50 configured to indicate a state of charge (SOC) of the rechargeable energy storage unit 14, between a global minimum 52 (0% SOC) and a global maximum 54 (100% SOC). The state of charge refers to the stored charge available to do work relative to that which is available after the rechargeable energy storage unit 14 has been fully charged. The state of charge may be viewed as an assessment of the potential energy of the unit 14. The state of charge impacts efficiency, emissions and power availability of the device 10 and thus may be employed for the purpose of regulating the operation of the device 10.

Referring to FIG. 2, the state of charge reading indicated by the state of charge meter 50 may fall into one of a plurality of non-overlapping ranges, referred to herein as windows. The non-overlapping ranges include a predefined first window ($W_1$ in FIG. 2) a predefined second window ($W_2$ in FIG. 2) and a predefined third window ($W_3$ in FIG. 2) each having a respective maximum and a respective minimum. Referring to FIG. 2, the respective minimum of the third window ($W_3$) is greater than the respective maximum of the second window ($W_2$), while the respective minimum of the second window ($W_2$) is greater than the respective maximum of the first window ($W_1$). The first window ($W_1$) may be further sub-divided into a lower portion (cross-hatched) and an upper portion (blank). The ranges of each of the windows are customizable based on the application at hand. In one embodiment, the respective ranges for the predefined first, second and third windows are [0%, 74.9%], [75.0%, 89.9%], [90.0%, 100%], respectively.

Figure 3:
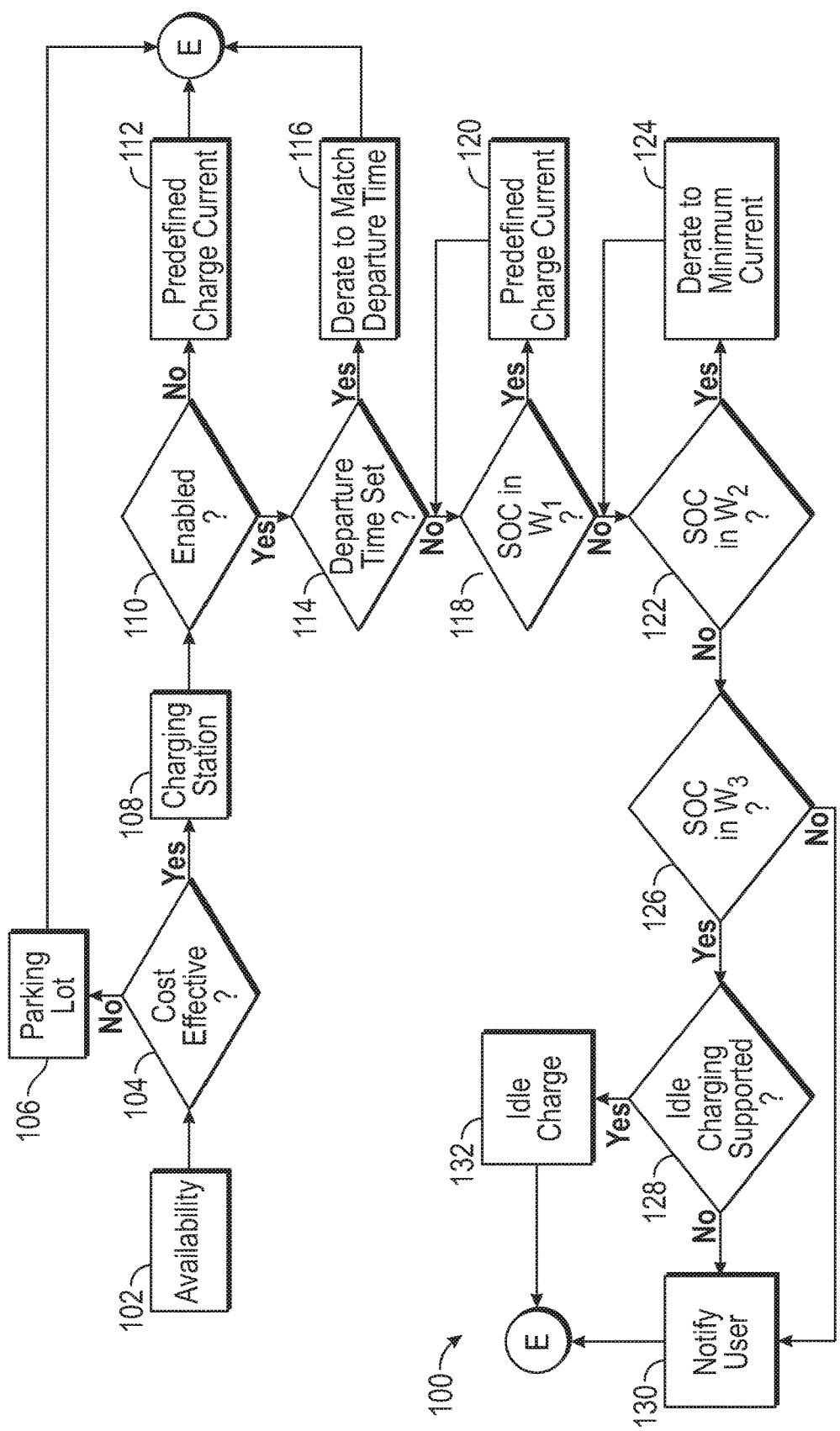
FIG. 3 is a schematic flow diagram of a method executable by the controller of FIG. 1.

Referring now to FIG. 3, a flowchart of the method 100 stored on and executable by the controller C of FIG. 1 is shown. Method 100 need not be applied in the specific order recited herein. Furthermore, it is to be understood that some steps may be eliminated. Referring to FIG. 3, method 100 may begin with block 102, where the controller C is programmed to determine availability of at least one charging station 40 and at least one parking lot 42, through a survey of local charging infrastructure 39 and local parking infrastructure 41, respectively, within a predefined radius R of the device 10. The information of what is available may be provided by the controller C to the user U if at least one of each is not available.

In block 104 of FIG. 3, the controller C is configured to determine if it is cost-effective during the excursion to incur a charging fee at the charging station 40 or incur a parking fee at the parking lot 42. If it is cost-effective to incur the parking fee, per block 106 of FIG. 3, the device 10 is deployed to the parking lot 42. If it is cost-effective to incur the charging fee, per block 108 of FIG. 3, the device 10 is deployed to the charging station 40.

In block 110 of FIG. 3, the controller C is configured to determine if the charging station 40 allows or enables adjustable charging modes, such as the open-ended charging mode, the defined departure charging mode and the idle charging mode. If not, per block 112, the controller C is configured to employ a predefined charge current limit or the charging current protocol of the charging station 40. If so, per block 114, the controller C is configured to determine if a predefined departure time, i.e. when the excursion is expected to end, has been selected by the user U. The departure time may be communicated by the user U to the controller C via the cellular wireless device 32.

If the departure time is set, per block 116 of FIG. 3, the controller C is configured to employ the defined departure charging mode, which includes derating a charging current such that charging of the rechargeable energy storage unit 14 is completed at the predefined departure time. For example, if the user's excursion or next scheduled departure is 3 hours long, the charging current is derated such that charging is completed in about 3 hours. Derating includes operation below the maximum power rating, current rating, or voltage rating in order to prolong battery life. The defined departure charging mode reduces current, which extends battery life and reduces the potential for lithium plating in the rechargeable energy storage unit 14.

The controller C is configured to employ an open-ended charging mode where no predefined departure time is selected. Referring to FIG. 3, if the departure time is not set, per block 118, the controller C is configured to determine if the state of charge (e.g. from the SOC indicator 50) is in the predefined first window ($W_1$). If so, per block 120 of FIG. 3, the controller C is configured to employ a predetermined relatively high charging current until the state of charge reading is no longer in the predefined first window ($W_1$). In one embodiment, the predetermined relatively high charging current is the maximum allowable current of the charging station 40.

If the state of charge reading is not in the predefined first window ($W_1$), per block 122 of FIG. 3, the controller C is configured to determine if the state of charge reading is in the predefined second window ($W_2$). If so, per block 124 of FIG. 3, the controller C is configured to employ a predetermined relatively low charging current until the state of charge reading is no longer in the predefined second window ($W_2$). In one embodiment, the predetermined relatively low charging current is the minimum allowable current of the charging station 40.

If the state of charge reading is not in the predefined second window ($W_2$), per block 126 of FIG. 3, the controller C is configured to determine if the state of charge reading is in the predefined third window ($W_3$). If so, per block 128 of FIG. 3, the controller C is configured to determine if an idle charging mode is supported by the charging station 40 and go into the idle charging mode if the idle charging mode is supported (per block 132). The idle charging mode is configured such that the charging current applied to the rechargeable energy storage unit 14 is about zero. If the state of charge reading is not in the predefined third window ($W_3$), per block 130 of FIG. 3, the controller C is configured to notify the user U that the charging is nearing completion.

Referring to FIG. 1, the device 10 may be configured to remain at the charging station 40 until the mobile application 36 commands it to leave. The controller C may be configured to continuously monitor the local charging infrastructure 39 to locate available charging stations within the predefined radius R that allow the idle charging mode. The method 100 may be dynamically executed. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

In summary, the system 12 (via execution of method 100) adjusts the charging profile of an autonomous device 10 to meet the excursion time of the user U. One of several charge-mode strategies are selectively employed to maximize time, minimize cost and improve battery life and functionality. The system 12 may maximize the time at the charging station 40 by employing a charging mode strategy at a reduced energy transfer rate to accommodate the schedule of a user U while avoiding a parking fee. The system 12 utilizes a defined departure time in order to optimize to the lowest possible current, saving battery life and reducing the potential for lithium plating in the rechargeable energy storage unit 14. Accordingly, the system 12 (and execution of the method 100) improves the functioning of the device 10.

The flowchart in FIG. 3 illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The controller C of FIG. 1 may be an integral portion of, or a separate module operatively connected to, other controllers of the device 10. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of selecting charging modes for a rechargeable energy storage unit in an autonomous device, the system comprising:
a controller operatively connected to the rechargeable energy storage unit and including a processor and tangible, non-transitory memory on which is recorded instructions;
wherein execution of the instructions by the processor causes the controller to:
determine availability of at least one charging station and at least one parking lot through a survey of local charging infrastructure and local parking infrastructure, respectively, within a predefined radius of the autonomous device;
determine if it is cost-effective during an excursion to incur a charging fee at the at least one charging station or incur a parking fee at the at least one parking lot; and
if it is cost-effective to incur the charging fee, then the controller is configured to selectively employ at least one of a plurality of charging modes, including an open-ended charging mode and a defined departure charging mode.

2. The system of claim 1, wherein:
the defined departure charging mode is employed where a predefined departure time is selected by a user of the autonomous device; and
the defined departure charging mode includes derating a charging current applied to the rechargeable energy storage unit such that charging is completed at the predefined departure time.

3. The system of claim 1, further comprising:
a state of charge (SOC) indicator configured to indicate a state of charge of the rechargeable energy storage unit in a plurality of non-overlapping range
wherein the state of charge reading includes a predefined first window, a predefined second window and a predefined third window each having a respective maximum and a respective minimum;
wherein the respective minimum of the predefined third window is greater than the respective maximum of the predefined second window; and
wherein the respective minimum of the predefined second window is greater than the respective maximum of the predefined first window.

4. The system of claim 3, wherein:
the controller is configured to employ the open-ended charging mode where no predefined departure time is selected;
the open-ended charging mode includes:
when the state of charge reading is in the predefined first window, employing a predetermined relatively high charging current;
when the state of charge reading is in the predefined second window, employing a predetermined relatively low charging current; and
when the state of charge reading is in the predefined third window, employing a charging current that is about zero.

5. The system of claim 4, wherein:
the predetermined relatively high charging current is a maximum current supported by the at least one charging station; and
the predetermined relatively low charging current is a minimum current supported by the at least one charging station.

6. The system of claim 1, further comprising:
a mobile application configured to be accessible by a user of the autonomous device; and
wherein the controller is configured to send a notification to the user, via the mobile application, regarding an estimated completion time for the energy storage device to reach a predefined threshold charge level.

7. The system of claim 6, wherein:
the mobile application is configured to allow the user to summon the autonomous device remotely; and
the mobile application is configured to allow the user to terminate a charging session and summon the autonomous device prior to an end of the excursion.

8. The system of claim 1, wherein the autonomous device is configured to remain at the at least one charging station until the mobile application commands it to leave.

9. The system of claim 1, wherein the plurality of charging modes includes an idle charging mode configured such that a charging current applied to the rechargeable energy storage unit is about zero.

10. The system of claim 9, wherein the controller is configured to continuously monitor the local charging infrastructure to locate available charging stations within the predefined radius that allow the idle charging mode.

11. A method for charging a rechargeable energy storage unit in an autonomous device having a controller with a processor and tangible, non-transitory memory, the method comprising:
determining availability of at least one charging station and at least one parking lot through a survey of local charging infrastructure and local parking infrastructure, respectively, within a predefined radius of the autonomous device, via the controller;
determining if it is cost-effective during an excursion to incur a charging fee at the at least one charging station or incur a parking fee at the at least one parking lot, via the controller; and
if it is cost-effective to incur the charging fee, then selectively employ at least one of a plurality of charging modes, including an open-ended charging mode and a defined departure charging mode, via the controller.

12. The method of claim 11, further comprising:
employing the defined departure charging mode where a predefined departure time is selected by a user of the autonomous device, via the controller; and
wherein the defined departure charging mode includes derating a charging current applied to the rechargeable energy storage unit such that charging is completed at the predefined departure time.

13. The method of claim 11, further comprising:
indicating a state of charge of the rechargeable energy storage unit via a state of charge (SOC) indicator;

wherein the state of charge reading includes a predefined first window, a predefined second window and a predefined third window each having a respective maximum and a respective minimum;

wherein the respective minimum of the predefined third window is greater than the respective maximum of the predefined second window; and wherein the respective minimum of the predefined second window is greater than the respective maximum of the predefined first window.

14. The method of claim 13, further comprising:
employing the open-ended charging mode where no predefined departure time is selected by a user, via the controller, the open-ended charging mode including:
when the state of charge reading is in the predefined first window, employing a predetermined relatively high charging current;
when the state of charge reading is in the predefined second window, employing a predetermined relatively low charging current; and
when the state of charge reading is in the predefined third window, employing a charging current that is about zero.

15. The method of claim 14, wherein:
the predetermined relatively high charging current is a maximum current supported by the at least one charging station; and
the predetermined relatively low charging current is a minimum current supported by the at least one charging station.

16. The method of claim 11, further comprising:
sending a notification regarding an estimated completion time for the energy storage device to reach a predefined threshold charge level to a user of the autonomous device, via a mobile application configured to be accessible by a user.

17. The method of claim 16, wherein:
allowing the user to summon the autonomous device remotely via the mobile application; and
allowing the user to terminate a charging session and summon the autonomous device prior to an end of the excursion via the mobile application.

18. The method of claim 11, wherein the plurality of charging modes includes an idle charging mode configured such that the charging current applied to the rechargeable energy storage unit is about zero.

19. The method of claim 18, further comprising:
continuously monitoring the local charging infrastructure to locate available charging stations within the predefined radius that allow the idle charging mode, via the controller.

20. A system of selecting charging modes for a rechargeable energy storage unit in an autonomous device, the system comprising:
a controller operatively connected to the rechargeable energy storage unit and including a processor and tangible, non-transitory memory on which is recorded instructions;
wherein execution of the instructions by the processor causes the controller to:
determine availability of at least one charging station and at least one parking lot through a survey of local charging infrastructure and local parking infrastructure, respectively, within a predefined radius of the autonomous device;
determine if it is cost-effective during an excursion to incur a charging fee at the at least one charging station or incur a parking fee at the at least one parking lot;
if it is cost-effective to incur the charging fee, then selectively employ at least one of a plurality of charging modes, including an open-ended charging mode and a defined departure charging mode;
wherein the defined departure charging mode is employed where a predefined departure time is selected by a user of the autonomous device and includes derating a charging current applied to the rechargeable energy storage unit such that charging is completed at the predefined departure time;
wherein the controller is configured to employ the open-ended charging mode where no predefined departure time is selected and the open-ended charging mode includes:
when the state of charge reading is in the predefined first window, employing a predetermined relatively high charging current;
when the state of charge reading is in the predefined second window, employing a predetermined relatively low charging current; and
when the state of charge reading is in the predefined third window, employing an approximately zero charging current.

* * * * *